(12) United States Patent
Nagano

(10) Patent No.: US 9,891,323 B2
(45) Date of Patent: Feb. 13, 2018

(54) GNSS SIGNAL PROCESSING METHOD, POSITIONING METHOD, GNSS SIGNAL PROCESSING PROGRAM, POSITIONING PROGRAM, GNSS SIGNAL PROCESSING DEVICE, POSITIONING APPARATUS AND MOBILE TERMINAL

(75) Inventor: Takeshi Nagano, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 753 days.

(21) Appl. No.: 14/365,599

(22) PCT Filed: Dec. 14, 2011

(86) PCT No.: PCT/JP2011/078918
§ 371 (c)(1),
(2), (4) Date: Jun. 13, 2014

(87) PCT Pub. No.: WO2013/088528
PCT Pub. Date: Jun. 20, 2013

(65) Prior Publication Data
US 2014/0347221 A1 Nov. 27, 2014

(51) Int. Cl.
*G01S 19/30* (2010.01)
*G01S 19/22* (2010.01)
(Continued)

(52) U.S. Cl.
CPC ............. *G01S 19/30* (2013.01); *G01S 19/22* (2013.01); *G01S 19/24* (2013.01); *H04B 1/7085* (2013.01);
(Continued)

(58) Field of Classification Search
CPC .......... G01S 19/22; G01S 19/24; G01S 19/37; H04B 1/7085; H04B 2201/70715
(Continued)

(56) References Cited

U.S. PATENT DOCUMENTS 6,243,409 B1 * 6/2001 Fenton ............... G01S 19/22
375/130
6,658,048 B1 * 12/2003 Valio ................. G01S 19/30
342/357.52
(Continued)

FOREIGN PATENT DOCUMENTS

JP         H11142502 A     5/1999

OTHER PUBLICATIONS

Townsend, Bryan et al., "A Practical Approach to the Reduction of Pseudorange Multipath Errors in a L1 GPS Receiver", Proceedings of ION GPS-94, the Seventh International Technical Meeting of the Satellite Division of the Institute of Navigation, Alexandria, VA, Sep. 1994, 6 pages.

(Continued)

*Primary Examiner* — Frank J McGue
(74) *Attorney, Agent, or Firm* — Alleman Hall Creasman & Tuttle LLP

(57) ABSTRACT

A demodulation unit for a GNSS signal processing device includes an operator that selects an error detecting method based on signs of early and late differential values and calculates an error detection value. A code phase range where an error detection value is not 0 is wide with a first error detecting method, and is narrow with a second. Immediately after capturing a GNSS signal, a code phase difference between the GNSS signal and a prompt replica signal is large, and signs of the early differential value and the late differential value are different from each other. In this case, the first method is used. As the code phase is driven, the code phase difference between the GNSS signal and the prompt replica signal becomes smaller, and the signs of the early differential value and the late differential value become the same. In this case, the second method is used.

8 Claims, 13 Drawing Sheets

(51) Int. Cl.
  *H04B 1/7085* (2011.01)
  *G01S 19/24* (2010.01)
  *G01S 19/37* (2010.01)

(52) U.S. Cl.
  CPC .... *G01S 19/37* (2013.01); *H04B 2201/70715* (2013.01)

(58) Field of Classification Search
  USPC .................................................. 342/357.69
  See application file for complete search history.

(56) References Cited

U.S. PATENT DOCUMENTS

| | | | | |
|---|---|---|---|---|
| 6,931,056 B2 * | 8/2005 | Goodings | ............... | G01S 19/30 342/357.69 |
| 6,987,820 B1 * | 1/2006 | Brenner | .................. | G01S 19/30 375/343 |
| 8,525,727 B2 * | 9/2013 | Roh | ........................ | G01S 19/22 342/357.35 |
| 8,665,147 B2 * | 3/2014 | Anandakumar | ...... | G01S 19/246 342/357.59 |
| 9,184,973 B2 * | 11/2015 | Yu | ........................... | G01S 19/24 |
| 9,515,697 B2 * | 12/2016 | Raasakka | ............... | G01S 19/26 |

OTHER PUBLICATIONS

Japanese Patent Office, International Search Report of PCT/JP2011/078918, WIPO, Jan. 17, 2012, 3 pages.

\* cited by examiner

GNSS SIGNAL PROCESSING METHOD, POSITIONING METHOD, GNSS SIGNAL PROCESSING PROGRAM, POSITIONING PROGRAM, GNSS SIGNAL PROCESSING DEVICE, POSITIONING APPARATUS AND MOBILE TERMINAL

TECHNICAL FIELD

The present invention relates to a GNSS signal processing method, with which a code phase of a GNSS signal code-modulated with a diffusion code is locked and tracked.

BACKGROUND ART

Conventionally, various kinds of devices have been proposed, which capture and track GNSS (Global Navigation Satellite System) signals, such as GPS (Global Positioning System) signals, and perform positioning. A GNSS signal is a signal obtained by code-modulating a carrier wave of a predetermined frequency with a diffusion code. The diffusion code is set for every GNSS satellite (GNSS signal) individually.

A positioning apparatus generally performs tracking of the GNSS signal with the following method. The positioning apparatus generates a replica signal having a replica code of the diffusion code set for the aimed GNSS satellite. The positioning apparatus correlates the received GNSS signal with the replica signal. The positioning apparatus calculates an error detection value based on the correlation value. The positioning apparatus controls a code phase of the replica signal by using the error detection value, locks the code phase of the aimed GNSS signal, and thus, tracks the aimed GNSS signal.

Meanwhile, with only direct wave signals which are the GNSS signals received directly by the positioning apparatus from the GNSS satellites, the tracking can easily and accurately be performed. If a multipath signal which is the GNSS signal reflected on a tall building or the like and then received by the positioning apparatus is included, the tracking accuracy may degrade.

As a method of avoiding the influence of this multipath signal, in Non-patent Document 1 and Patent Document 1, a calculation equation of the error detection value is set so that the correlation value becomes "0" within a specific code phase range. Specifically, with the code phase of the aimed GNSS signal as a reference phase, an insensible range where the correlation value becomes "0" is set within a predetermined code phase range which is away from the reference phase by a predetermined code phase. When the code phase of the multipath signal enters this insensible range, the code phase of the aimed GNSS signal is locked without receiving the influence of the multipath signal.

REFERENCE DOCUMENTS OF CONVENTIONAL ART

Patent Document(s)

Patent Document 1: JP1999-142502A

Non-Patent Document(s)

Non-patent Document 1: "A Practical Approach to the Reduction of Pseudorange Multipath Errors in a L1 GPS Receiver", Bryan R. Townsend and Patrick C. Fenton, NovAtel Communications Ltd., ION GPS-94, Salt Lake City, Sep. 20-23, 1994

DISCLOSURE OF THE INVENTION

Problems to be Solved by the Invention

However, with the methods described in Patent Document 1 and Non-patent Document 1 described above, if the code phase of the aimed GNSS signal of the direct wave signal enters the insensible range, the code phase cannot be locked. In this case, the aimed GNSS signal can no longer be tracked.

Then, in the capturing processing, a plurality of replica signals for capturing are generated with a predetermined code phase resolution and a code phase to be given in the initial stage of the tracking is set based on correlation values of the respective replica signals with the GNSS signal. Therefore, the detected code phase is not necessarily the one which is extremely close to the code phase of the aimed GNSS signal. When shifting from the capturing to the tracking, the code phase difference to a certain extent remains between the code phases of the aimed GNSS signal and the replica signal, and the code phase of the aimed GNSS signal may enter the insensible range. Particularly when a code phase interval of the replica signals for capturing is large, it is easier to enter the insensible range.

Therefore, the present invention aims to provide a GNSS signal processing method, with which a code phase of an aimed GNSS signal can surely locked with a high accuracy.

SUMMARY OF THE INVENTION

A GNSS signal processing method of this invention includes a correlating process, a differential value calculating process, an error detection value calculating process, and a code phase controlling process.

In the correlating process, the GNSS signal is correlated with each of a first early replica signal that is advanced from a prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase.

In the differential value calculating process, an early differential value is calculated by subtracting a second early correlation value from a first early correlation value. The first early correlation value is obtained based on the correlation result between the GNSS signal and the first early replica signal. The second early correlation value is obtained based on the correlation result between the GNSS signal and the second early replica signal. In the differential value calculating process, a late differential value is calculated by subtracting a second late correlation value from a first late correlation value. The first late correlation value is obtained based on the correlation result between the GNSS signal and the first late replica signal. The second late correlation value is obtained based on the correlation result between the GNSS signal and the second late replica signal.

In the error detection value calculating process, an error calculating method is set based on signs of the early differential value and the late differential value, and an error detection value is calculated by using the set error calculating method.

In the code phase controlling process, a code phase of the prompt replica signal is controlled based on the error detection value, and a code phase of the GNSS signal is tracked.

This method utilizes that the signs of the early differential value and the late differential value change according to a phase difference between a code phase of the received GNSS signal and a code phase of the prompt replica signal. By suitably setting the error detecting method based on the signs of the early differential value and the late differential value, a suitable code phase control according to the code phase difference is possible. Thus, tracking performance of the GNSS signal improves.

Moreover, in the error detection calculating process of the GNSS signal processing method of this invention, when the signs of the early differential value and the late differential value are different from each other, the error detection value may be calculated with a first error detecting method using a first calculation equation by which a code phase range where the error detection value takes a value other than 0 becomes wide. In the error detection calculating process, when the signs of the early differential value and the late differential value are the same as each other, the error detection value may be calculated with a second error detecting method using a second calculation equation by which the code phase range where the error detection value takes a value other than 0 becomes narrow.

This method shows specific examples of the error detecting method to be selected. When the signs of the early differential value and the late differential value are different from each other, as described in the embodiment and the respective drawings below, the code phase difference between the prompt replica signal and the GNSS signal is large. Therefore, by using the first error detecting method with the wide code phase range where the error detection value does not become 0, the GNSS signal is not easily lost and sure tracking thereof becomes possible. When the signs of the early differential value and the late differential value are the same as each other, as described in the embodiment and the respective drawings below, the code phase difference between the prompt replica signal and the GNSS signal is small. Therefore, by using the second error detecting method with the narrow code phase range where the error detection value takes a value other than 0, influence of a multipath is not easily received, the code phase of the GNSS signal can be kept locked highly accurately, and highly accurate tracking becomes possible.

Moreover, with the GNSS signal processing method of this invention, the first calculation equation may use the first early correlation value and the first late correlation value, or the second early correlation value and the second late correlation value. With the GNSS signal processing method of this invention, the second calculation equation may use the first and second early correlation values and the first and second late correlation values.

With this method, combinations of the correlation values to be used in the first calculation equation and the second calculation equation are shown. Although specific calculation equations are described in the embodiment below, by using such combinations of the correlation values, properties of the error detection value as described above can easily be achieved.

Moreover, a positioning method of this invention includes a process for acquiring a navigation message based on the correlation result between the GNSS signal tracked with the GNSS signal processing method of any of the description above and the prompt replica signal. This positioning method includes a process for calculating a pseudorange based on the error detection value of the tracked GNSS signal. This positioning method includes a process for performing positioning by using the navigation message and the pseudorange.

With this method, by using the GNSS signal surely and highly accurately tracked as described above, the demodulation of the navigation message can surely be performed, and the pseudorange can be calculated highly accurately. Thus, highly accurate positioning becomes possible.

Effect(s) of the Invention

According to this invention, a code phase of an aimed GNSS signal can be tracked surely and highly accurately.

MODE(S) FOR CARRYING OUT THE INVENTION

Figure 1:
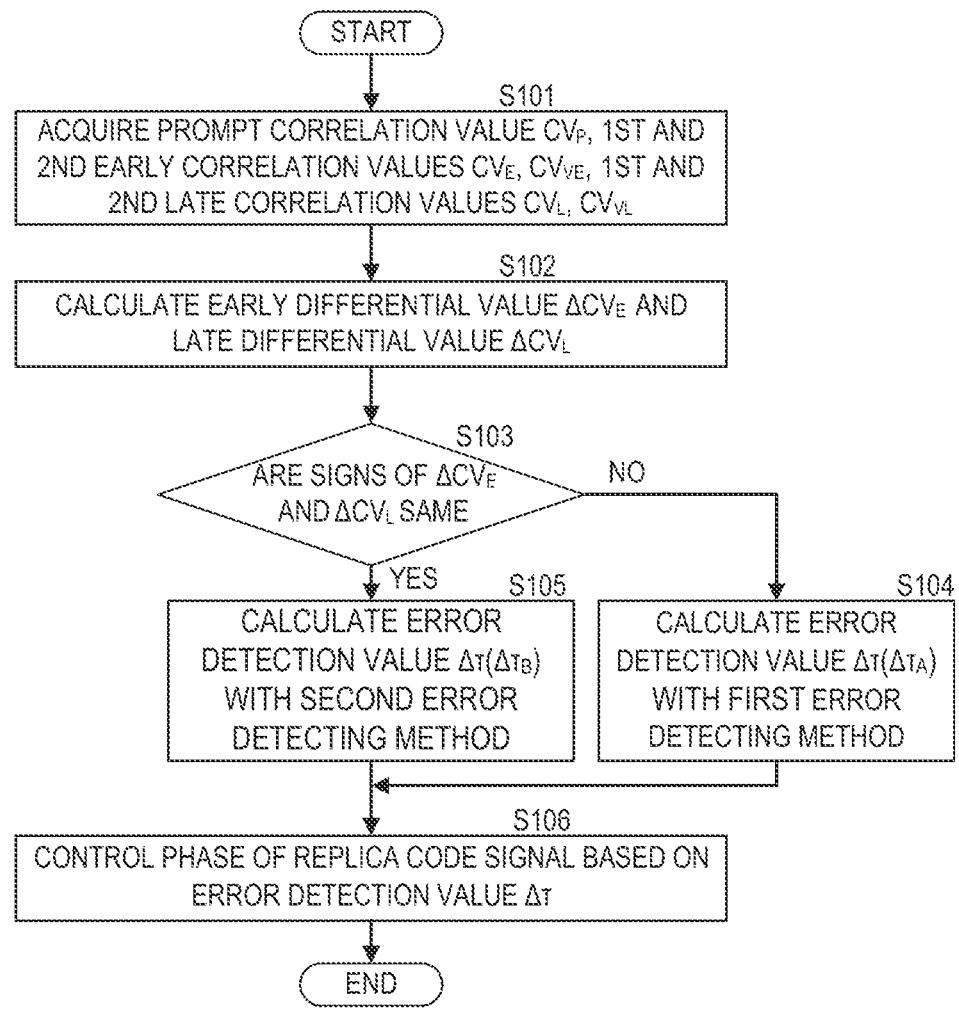
FIG. 1 is a flowchart of a GNSS signal processing method according to an embodiment of the present invention.

A GNSS signal processing method according to an embodiment of the present invention is described with reference to the drawings. FIG. 1 is a flowchart of the GNSS signal processing method according to the embodiment of the present invention.

With the GNSS signal processing method of this embodiment, an aimed GNSS signal is tracked by repeating the flow illustrated in FIG. 1.

Figure 2:
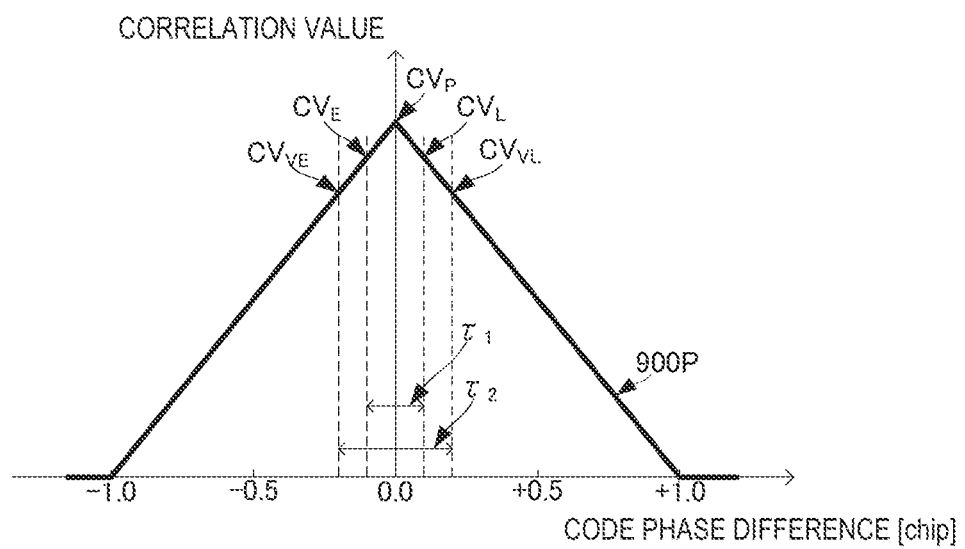
FIG. 2 is a chart illustrating a relation of timings of code phases of respective replica signals with the GNSS signal processing method according to the embodiment of the present invention.

As Step S101, the GNSS signal is correlated with respective replica signals to calculate respective correlation values. A replica signal is a signal having a replica code of a diffusion code signal of the aimed GNSS signal. As the replica signals, a prompt replica signal $S_{RP}$, a first early replica signal $S_{RE}$, a second early replica signal $S_{RVE}$, a first late replica signal $S_{RL}$, and a second late replica signal $S_{RVL}$ are used. Code phases of these replica signals are set as illustrated in FIG. 2. FIG. 2 is a chart illustrating a relation of timings of code phases of the respective replica signals with the GNSS signal processing method according to the embodiment of the present invention.

As illustrated in FIG. 2, the code phase of the replica code is set to the prompt replica signal $S_{RP}$ so as to match with that of the received GNSS signal, based on a previously calculated error detection value $\Delta\tau$. In other words, the code phase of the prompt replica signal $S_{RP}$ is set so as to obtain the highest correlation value with the GNSS signal.

As illustrated in FIG. 2, the first early replica signal $S_{RE}$ is a signal of which code phase is advanced compared to the prompt replica signal $S_{RP}$ by a code phase difference $\tau_1/2$. The second early replica signal $S_{RVE}$ is a signal of which code phase is advanced compared to the prompt replica signal $S_{RP}$ by a code phase difference $\tau_2/2$. The code phase difference $\tau_2/2$ is set to be larger than the code phase difference $\tau_1/2$. For example, the code phase difference $\tau_1/2$ is 0.05 chip, and the code phase difference $\tau_2/2$ is 0.075 chip.

As illustrated in FIG. 2, the first late replica signal $S_{RL}$ is a signal of which code phase is retarded than the prompt replica signal $S_{RP}$ by the code phase difference $\tau_1/2$. The second late replica signal $S_{RVE}$ is a signal of which code phase is retarded than the prompt replica signal $S_{RP}$ by the code phase difference $\tau_2/2$.

By setting such code phases, the code phase difference (spacing) between the first early replica signal $S_{RE}$ and the first late replica signal $S_{RL}$ becomes $\tau_1$. For example, in the example above, the spacing is 0.1 chip. Moreover, the code phase difference (spacing) between the second early replica signal $S_{RVE}$ and the second late replica signal $S_{RVL}$ becomes $\tau_2$. For example, in the example above, the spacing is 0.15 chip.

By correlating the GNSS signal with the prompt replica signal $S_{RP}$, a prompt correlation value $CV_P$ is calculated. By correlating the GNSS signal with the first early replica signal $S_{RE}$, a first early correlation value $CV_E$ is calculated. By correlating the GNSS signal with the second early replica signal $S_{RVE}$, a second early correlation value $CV_{VE}$ is calculated. By correlating the GNSS signal with the first late replica signal $S_{RL}$, a first late correlation value $CV_L$ is calculated. By correlating the GNSS signal with the second late replica signal $S_{RVL}$, a second late correlation value $CV_{VE}$ is calculated.

Next, an early differential value $\Delta CV_E$ and a late differential value $\Delta CV_L$ are calculated (S102). The early differential value $\Delta CV_E$ is calculated by subtracting the second early correlation value $CV_{VE}$ from the first early correlation value $CV_E$. Specifically, the early differential value $\Delta CV_E$ is calculated by using a calculation equation of the early differential value $\Delta CV_E = CV_E - CV_{VE}$. The late differential value $\Delta CV_L$ is calculated by subtracting the second late correlation value $CV_{VL}$ from the first late correlation value $CV_L$. Specifically, the late differential value $\Delta CV_L$ is calculated by using a calculation equation of the late differential value $\Delta CV_L = CV_L - CV_{VL}$.

Next, signs of the early differential value $\Delta CV_E$ and the late differential value $\Delta CV_L$ are compared to each other. If the sign of the early differential value $\Delta CV_E$ is different from the sign of the late differential value $\Delta CV_L$, (S103: NO), an error detection value $\Delta\tau$ ($\Delta\tau_A$) is calculated with a first error detecting method. With the first error detecting method, the error detection value $\Delta\tau$ ($\Delta\tau_A$) is calculated by substituting the first early correlation value $CV_E$, the first late correlation value $CV_L$, and the prompt correlation value $CV_P$, into the following first calculation equation.

$$\Delta\tau_A = \frac{CV_E - CV_L}{2CV_P} \qquad (1)$$

If the signs of the early differential value $\Delta CV_E$ and the late differential value $\Delta CV_L$ are the same (S103: YES), an error detection value $\Delta\tau$ ($\Delta\tau_B$) is calculated with a second error detecting method. With the second error detecting method, the error detection value $\Delta\tau$ ($\Delta\tau_B$) is calculated by substituting the first and second early correlation values $CV_E$ and $CV_{VE}$, the first and second late correlation values $CV_L$ and $CV_{VL}$, and the prompt correlation value $CV_P$, into the following second calculation equation.

$$\Delta\tau_B = \frac{c_2(CV_E - CV_L) - c_3(CV_{VE} - CV_{VL})}{2c_1 CV_P} \qquad (2)$$

Note that, in Equation 2, $c_1$, $c_2$ and $c_3$ are suitably set invariables.

Next, by using the calculated error detection value $\Delta\tau$ (either one of $\Delta\tau_A$ and $\Delta\tau_B$), a code phase control of the replica signal is performed. Here, the code phase of the prompt replica signal $S_{RP}$ is advanced or retarded so that the error detection value $\Delta\tau$ becomes 0. Further, due to the code phase of the prompt replica signal $S_{RP}$ being set as above, the code phases of the first and second early replica signals $S_{RE}$ and $S_{RVE}$, and the first and second late replica signals $S_{RL}$ and $S_{RVL}$ are also set as described above.

By repeating such calculation of the error detection value $\Delta\tau$ and such code phase control, the code phase of the GNSS signal is locked and the tracking of the GNSS signal is performed. Here, the locking of the code phase indicates that the code phase control is performed so that the code phases of the prompt replica signal $S_{RP}$ and the code phase of the GNSS signal substantially match with each other continuously.

Further, in the present invention, as described above, the calculation equation is selected depending on the situation and the error detection values are calculated. Next, operations and effects obtained by such selection of the calculation equations of the error detection values $\Delta\tau$ is described.

Figure 3:
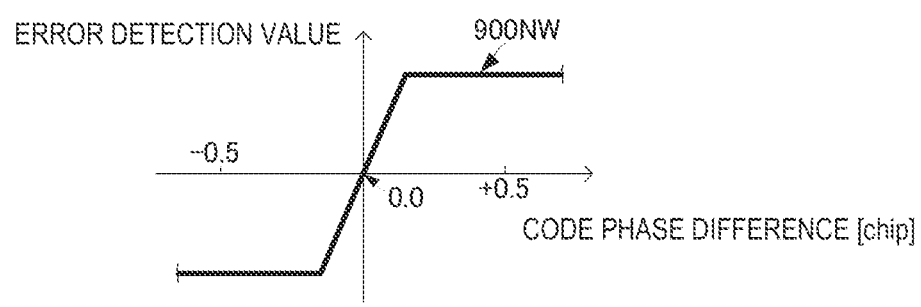
FIG. 3 is a chart illustrating a property of an error detection value $\Delta\tau_A$ with respect to a code phase difference, which is calculated with a first error detecting method.
Figure 4:
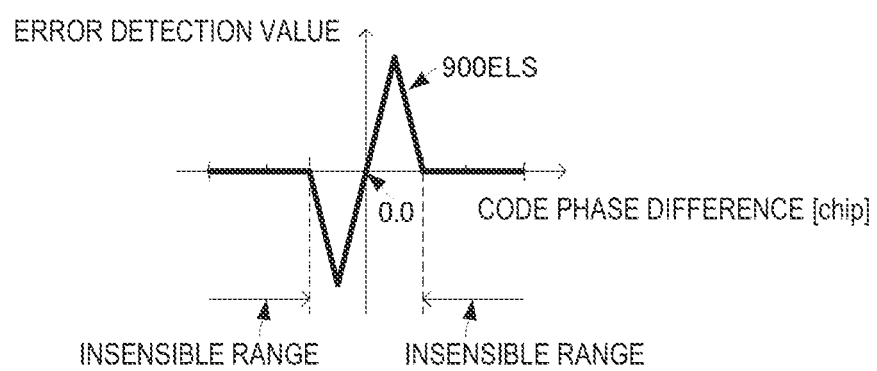
FIG. 4 is a chart illustrating a property of an error detection value $\Delta\tau_B$ with respect to the code phase difference, which is calculated with a second error detecting method.

First, code phase difference properties of the error detection values $\Delta\tau$ when the first error detecting method (Equation 1) is used and when the second error detecting method (Equation 2) is used are described, respectively. FIG. 3 is a chart illustrating a property (900NW) of the error detection value $\Delta\tau_A$ with respect to the code phase difference, which is calculated with the first error detecting method. FIG. 4 is a chart illustrating a property (900ELS) of the error detection value $\Delta\tau_B$ with respect to the code phase difference, which is calculated with the second error detecting method. Note that, FIGS. 3 and 4 are illustrated schematically so that only a difference of the properties can be understood clearly.

When the first calculation equation (Equation 1) of the first error detecting method is used (in the case with the property as in FIG. 3), the error detection value $\Delta\tau$ ($\Delta\tau_A$) does not become 0 until the absolute value of the code phase difference corresponds to 1.0 chip, except for the case where the code phase difference is 0. Therefore, the error detection value $\Delta\tau$ that is not 0 can be obtained in a wide range of the code phase difference. Thus, even if the code phase difference between the aimed GNSS signal and the prompt replica signal $S_{RP}$ is comparatively large, the code phase control of the prompt replica signal $S_{RP}$ can be performed so that these code phases surely match with each other.

By such properties, the first error detecting method is particularly effective while shifting from the capturing to the tracking. In the capturing processing of the GNSS signal, normally a plurality of replica signals are generated at predetermined code phase intervals and correlated with the GNSS signal. Then, for example, the code phase of the replica signal with the highest correlation value is set to be an initial code phase in tracking the GNSS signal. Therefore, it is because, depending on the code phase interval to be used in the capturing and the reception situation, the code phase in the initial stage of the tracking may be away from the true code phase of the GNSS signal. Note that, with the code phase property as in the first error detecting method, since the code phase range where the error detection value is not 0 is wide, influence of a multipath signal is easily received.

When the second calculation equation (Equation 2) of the second error detecting method is used (in the case with the property as in FIG. 4), the code phase ranges where the error detection value $\Delta\tau$ ($\Delta\tau_B$) becomes 0 exist before the absolute value of the code phase difference corresponds to 1.0 chip, except for the case where the code phase difference is 0. When this property is described more specifically, as illustrated in FIG. 4, the error detection value $\Delta\tau$ ($\Delta\tau_B$) does not become 0 from a predetermined chip (negative value) at which the code phase difference is on 0.0 side than −1.0 chip, to a predetermined chip (positive value) at which the code phase difference is on 0.0 side than +1.0 chip, except for the case where the code phase difference is 0. Further, the insensible ranges where the error detection value $\Delta\tau$ ($\Delta\tau_B$) becomes 0 are provided, each over a predetermined code phase range on a side of the code phase difference away from 0.0 than such a range where the error detection value $\Delta\tau$ does not become 0. Thus, even if the multipath signal is received, the code phase of the multipath signal becomes easier to enter the insensible ranges. By the code phase of the multipath signal entering the insensible range, the code phase control can be performed accurately without receiving the influence of the multipath signal.

By such properties, the second error detecting method is particularly effective in the state where the code phase difference between the prompt replica signal $S_{RP}$ and the GNSS signal becomes small and is driven close to 0. In this case, the code phase is controlled so that the code phase difference between the prompt replica signal $S_{RP}$ and the GNSS signal becomes 0, and even if the multipath signal is received, the influence of the multipath signal does not appear on the error detection value $\Delta\tau$ ($\Delta\tau_B$). Therefore, the code phase can be controlled accurately.

By using either one of the first error detecting method and the second error detecting method according to the situation as described above, the code phase of the aimed GNSS signal can surely be locked with a high accurately, and the aimed GNSS signal can be tracked. Further, even if the multipath signal is received during the tracking, the aimed GNSS signal can accurately be kept tracked without receiving the influence of the multipath signal.

Figure 5:
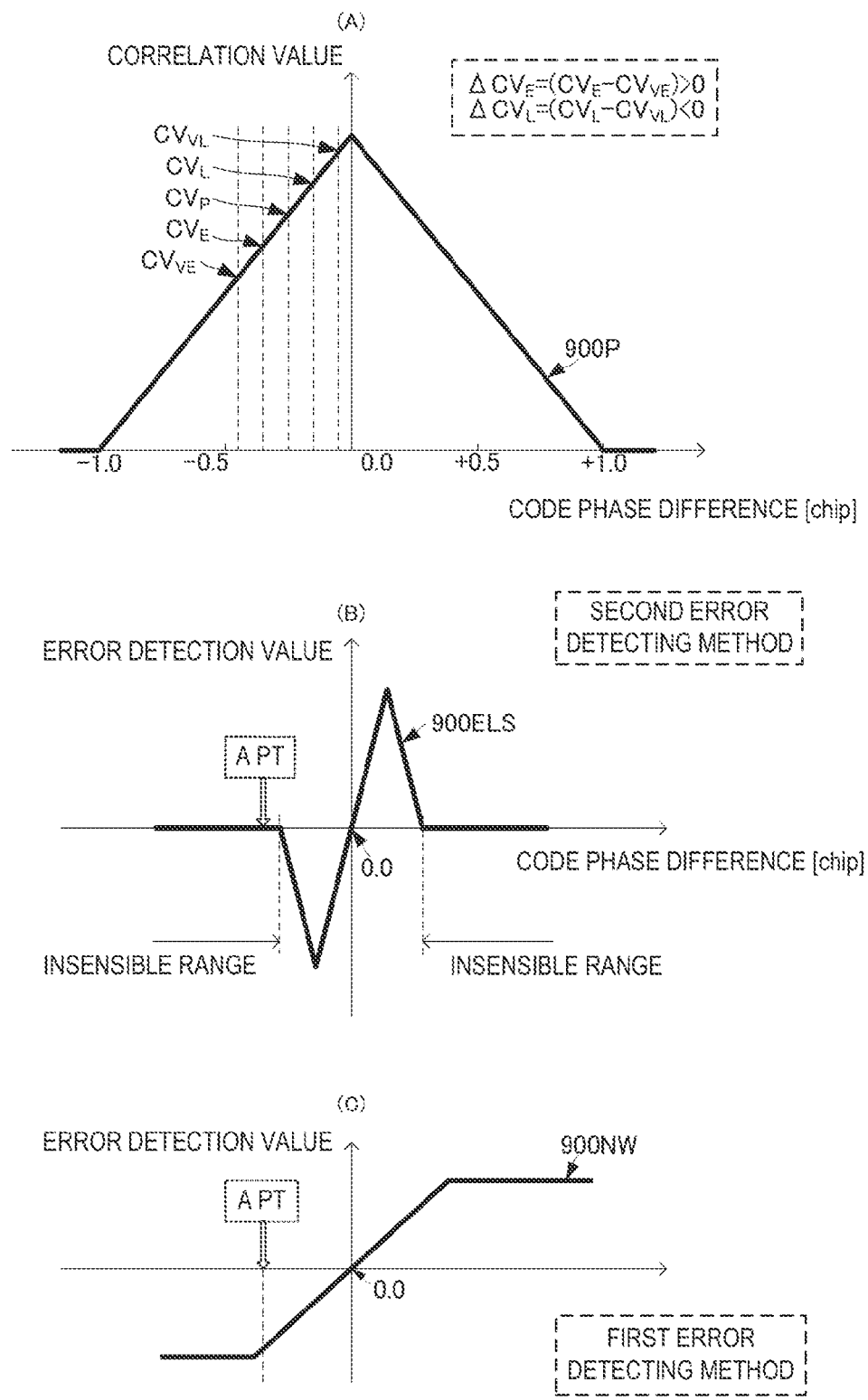
FIG. 5 shows charts illustrating a first situation where a code phase of a prompt replica signal is advanced compared to that of an aimed GNSS signal.
Figure 6:
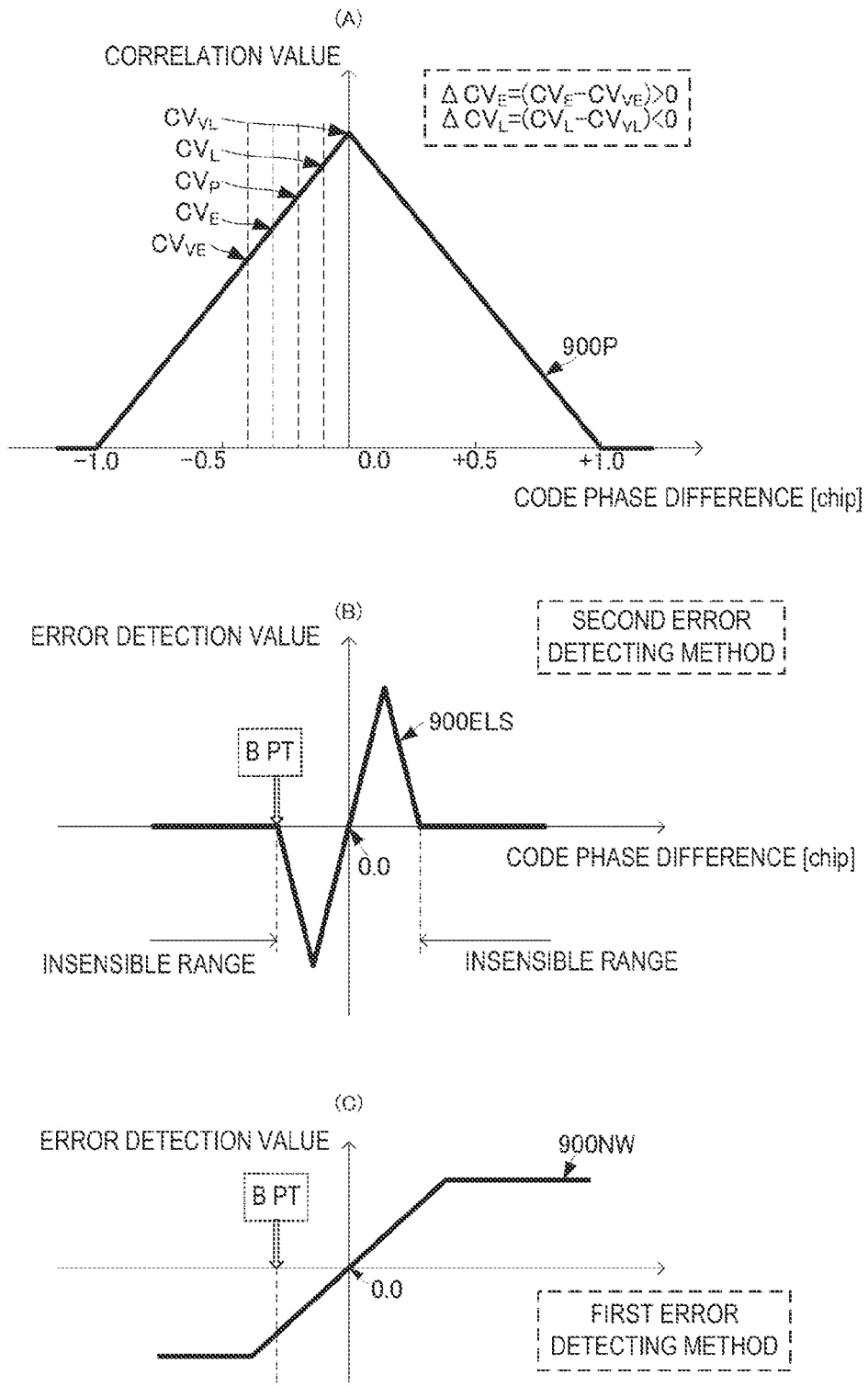
FIG. 6 shows charts illustrating a second situation where the code phase of the prompt replica signal is advanced compared to that of the aimed GNSS signal.
Figure 7:
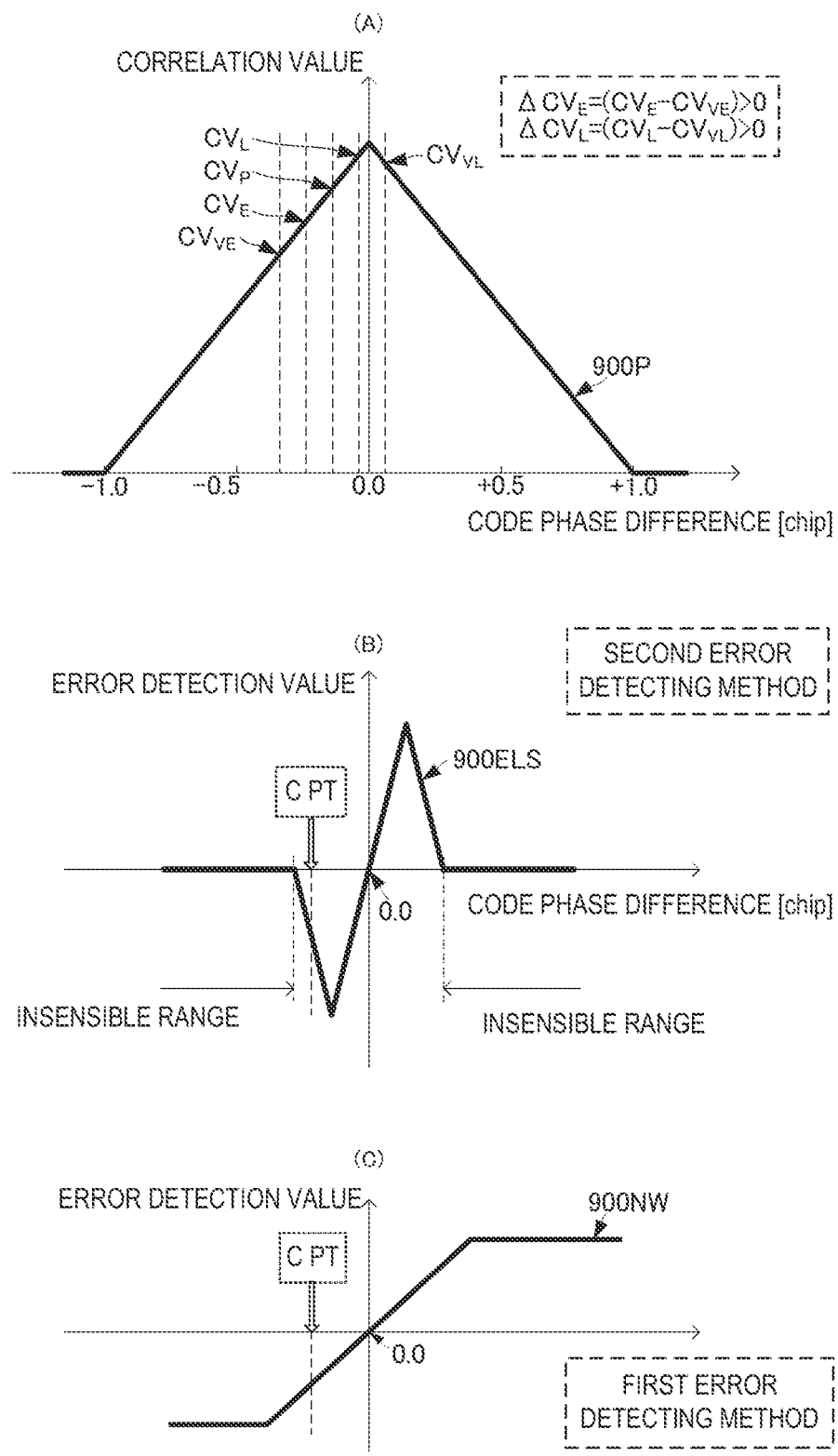
FIG. 7 shows charts illustrating a third situation where the code phase of the prompt replica signal is advanced compared to that of the aimed GNSS signal.

Next, the determining method of selecting between the first and second error detecting methods is described. FIG. 5 shows charts illustrating a first situation where the code phase of the prompt replica signal $S_{RP}$ is advanced compared to that of the aimed GNSS signal. FIG. 6 shows charts illustrating a second situation where the code phase of the prompt replica signal $S_{RP}$ is advanced compared to that of the aimed GNSS signal. FIG. 7 shows charts illustrating a third situation where the code phase of the prompt replica signal $S_{RP}$ is advanced compared to that of the aimed GNSS signal. Here, with the first situation, the code phase difference between the prompt replica signal $S_{RP}$ and the aimed GNSS signal is larger than the second and third situations. In the second situation, the code phase difference between the prompt replica signal $S_{RP}$ and the aimed GNSS signal is larger than the third situation.

Figure 8:
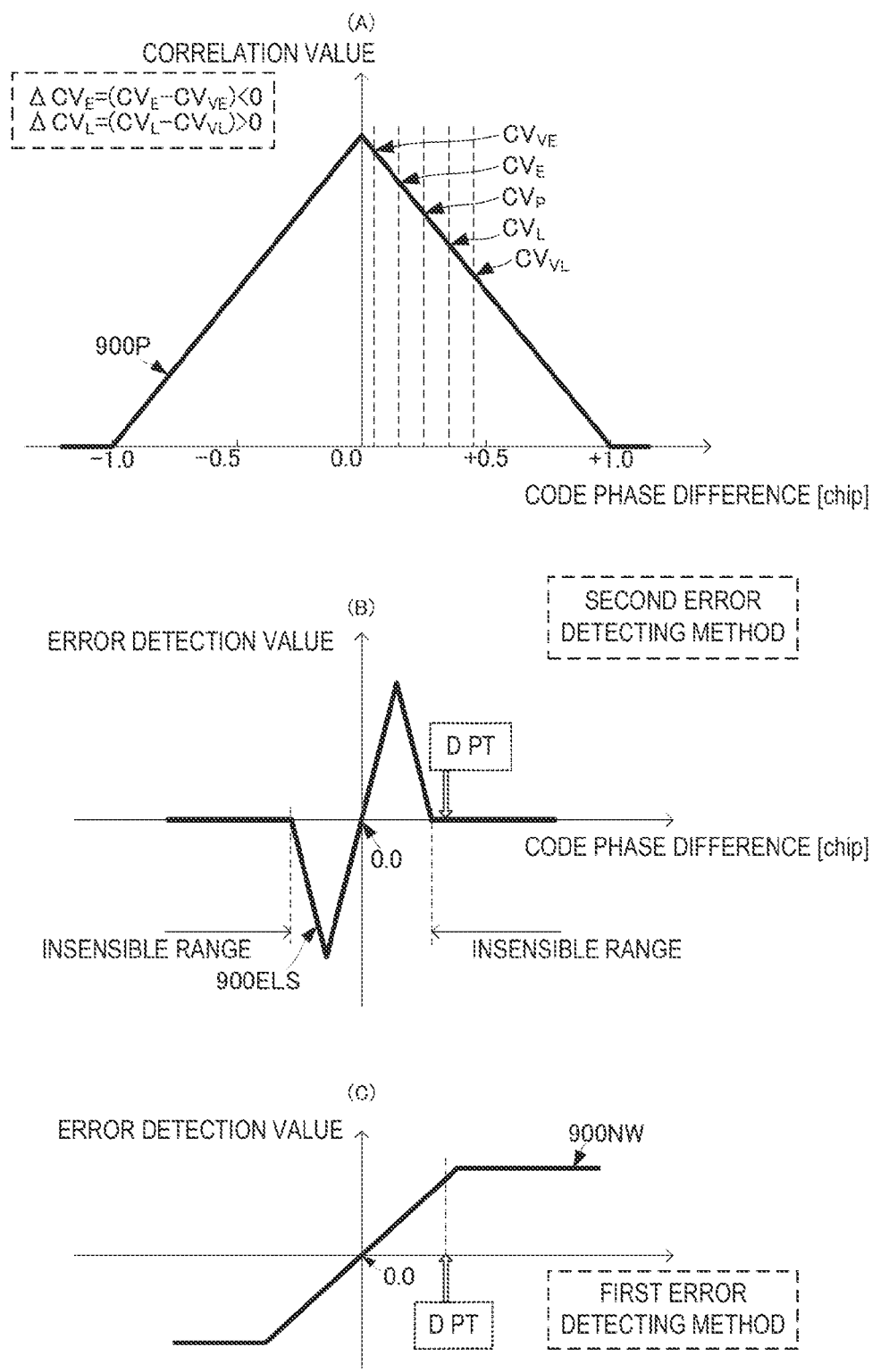
FIG. 8 shows charts illustrating a fourth situation where the code phase of the prompt replica signal is retarded than that of the aimed GNSS signal.
Figure 9:
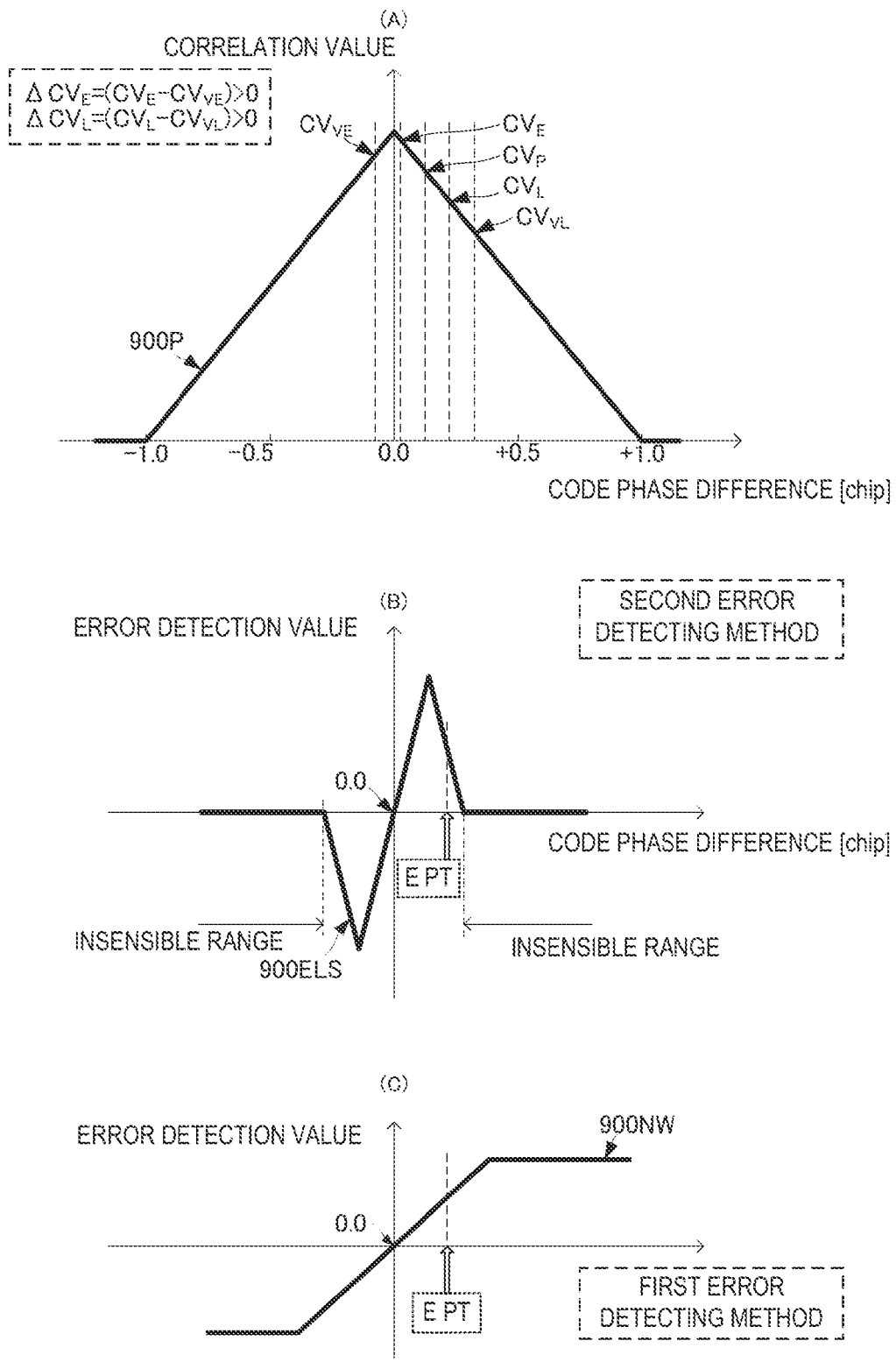
FIG. 9 shows charts illustrating a fifth situation where the code phase of the prompt replica signal is retarded than that of the aimed GNSS signal.

FIG. 8 shows charts illustrating a fourth situation where the code phase of the prompt replica signal $S_{RP}$ is retarded than that of the aimed GNSS signal. FIG. 9 shows charts illustrating a fifth situation where the code phase of the prompt replica signal $S_{RP}$ is retarded than that of the aimed GNSS signal. Here, in the fourth situation, the code phase difference between the prompt replica signal $S_{RP}$ and the aimed GNSS signal is larger than the fifth situation.

In FIGS. 5, 6, 7, 8 and 9, (A) illustrates the correlation value property based on the code phase difference between the replica signal and the GNSS signal, and 900P indicates a correlation curve. (B) illustrates the code phase difference property of the error detection value in the case of using the second error detecting method, and 900ELS indicates a second error detection value property curve. (C) illustrates the code phase difference property of the error detection value in the case of using the first error detecting method, and 900NW indicates a first error detection value property curve.

(1) A Case where the Code Phase of the Prompt Replica Signal $S_{RP}$ is Advanced Compared to that of the Aimed GNSS Signal.

As illustrated in FIG. 5, as the first situation, when the code phase of the prompt replica signal $S_{RP}$ is advanced greatly from the aimed GNSS signal, the first and second early correlation value $CV_E$ and $CV_{VE}$, the first and second late correlation values $CV_L$ and $CV_{VL}$, and the prompt correlation value $CV_P$ appear in line on the correlation curve 900P within a range where the code phase difference is a negative value.

In this case, the first early correlation value $CV_E$ becomes higher than the second early correlation value $CV_{VE}$. The prompt correlation value $CV_P$ becomes higher than the first early correlation value $CV_E$. The first late correlation value $CV_L$ becomes higher than the prompt correlation value $CV_P$. The second late correlation value $CV_{VL}$ becomes higher than the first late correlation value $CV_L$. That is, $CV_E < CV_{VE} < CV_P < CV_L < CV_{VL}$.

Therefore, the early differential value $\Delta CV_E = CV_E - CV_{VE}$ becomes a positive value. The late differential value $\Delta CV_L = CV_L - CV_{VL}$ becomes a negative value. Therefore, the signs of the early differential value $\Delta CV_E$ and the late differential value $\Delta CV_L$ are different from each other.

Here, the position of the code phase of the prompt replica signal $S_{RP}$ is an A point, and as illustrated in FIG. 5 at (B), the error detection value $\Delta\tau_B$ obtained with the second error detecting method becomes 0. As illustrated in FIG. 5 at (C), the error detection value $\Delta\tau_A$ obtained with the first error detecting method becomes a negative value. Therefore, the code phase control is not possible with the second error detecting method, but is possible with the first error detecting method.

Next, as illustrated in FIG. 6, as the second situation, when the code phase of the prompt replica signal $S_{RP}$ is advanced greatly from the aimed GNSS signal (when it is not as advanced as the first situation), similarly to the first situation, the first and second early correlation value $CV_E$ and $CV_{VE}$, the first and second late correlation values $CV_L$ and $CV_{VL}$, and the prompt correlation value $CV_P$ appear in line on the correlation curve 900P within the range where the code phase difference is a negative value.

Therefore, similarly to the first situation, the early differential value $\Delta CV_E = CV_E - CV_{-VE}$ becomes a positive value. The late differential value $\Delta CV_L = CV_L - CV_{VL}$ becomes a negative value. Therefore, the signs of the early differential value $\Delta CV_E$ and the late differential value $\Delta CV_L$ are different from each other.

In this second situation, the position of the code phase of the prompt replica signal $S_{RP}$ is a B point, and as illustrated in FIG. 6 at (B), the error detection value $\Delta\tau_B$ obtained with the second error detecting method becomes a border of switching from 0 to a negative value. As illustrated in FIG. 6 at (C), the error detection value $\Delta\tau_A$ obtained with the first error detecting method becomes a negative value. Therefore, if the code phase difference of the prompt replica signal $S_{RP}$ from the aimed GNSS signal is smaller than this second situation, there is a possibility that the code phase control can be performed even with the second error detecting method. However, actually, it is better to take an observation error into consideration, but by taking the observation error into consideration, it is difficult to perform the code phase control with the second error detecting method. And, the code phase control is possible with the first error detecting method.

Next, as illustrated in FIG. 7, as the third situation, in the state where the code phase of the prompt replica signal $S_{RP}$ is advanced and when the code phase difference therebetween is small (in the case where it is not as advanced as the first or second situation), the first and second early correlation values $CV_E$, $CV_{VE}$, the first late correlation value $CV_L$, and the prompt correlation value $CV_P$ appear in line on the correlation curve 900P within the range where the code phase difference is a negative value. However, the second late correlation value $CV_{VL}$ appears on the correlation curve 900P within a range where the code phase difference is a positive value. Then, when the code phase difference between the aimed GNSS signal and the first late correlation value $CV_L$ becomes smaller than the code phase difference between the aimed GNSS signal and the second late correlation value $CV_L$, the late differential value $\Delta CV_L = CV_L - CV_{VL}$ becomes a positive value.

Therefore, both the early differential value $\Delta CV_E$, and the late differential value $\Delta CV_L = CV_L - CV_{VL}$ become positive values. Therefore, the signs of the early differential value $\Delta CV_E$ and the late differential value $\Delta CV_L$ become the same.

In this case, the position of the code phase of the prompt replica signal $S_{RP}$ is a C point, and as illustrated in FIG. 7 at (B) and FIG. 7 at (C), both of the error detection value $\Delta\tau_B$ obtained with the second error detecting method and the error detection value $\Delta\tau_A$ obtained with the first error detecting method are negative values. Therefore, the code phase control is possible even with the second error detecting method or the first error detecting method. However, as described above, since the influence of the multipath signal is easily received with the first error detecting method, the method is switched to the second error detecting method. Thus, after this switch, the influence of the multipath signal is not easily received and the code phase control can be performed accurately so that that code phase of the aimed GNSS signal is locked.

(2) a Case where the Code Phase of the Prompt Replica Signal $S_{RP}$ is Retarded than the Aimed GNSS Signal.

As illustrated in FIG. 8, as the fourth situation, when the code phase of the prompt replica signal $S_{RP}$ is greatly retarded than the aimed GNSS signal, the first and second early correlation value $CV_E$ and $CV_{VE}$, the first and second late correlation values $CV_L$ and $CV_{VL}$, and the prompt correlation value $CV_P$ appear in line on the correlation curve 900P within the range where the code phase difference is a positive value.

In this case, the first early correlation value $CV_E$ becomes lower than the second early correlation value $CV_{VE}$. The prompt correlation value $CV_P$ becomes lower than the first early correlation value $CV_E$. The first late correlation value $CV_L$ becomes smaller than the prompt correlation value $CV_P$. The second late correlation value $CV_{VE}$ becomes lower than the first late correlation value $CV_L$. That is, $CV_{VE} > CV_E > CV_P > CV_{VL} > CV_L$.

Therefore, the early differential value $\Delta CV_E = CV_E - CV_{VE}$ becomes a negative value. The late differential value $\Delta CV_E = CV_E - CV_{VL}$ becomes a positive value. Therefore, the signs of the early differential value $\Delta CV_E$ and the late differential value $\Delta CV_L$ are different from each other.

Here, the position of the code phase of the prompt replica signal $S_{RP}$ is a D point, and as illustrated in FIG. 8 at (B), the error detection value $\Delta\tau_B$ obtained with the second error detecting method becomes 0. As illustrated in FIG. 8 at (C), the error detection value $\Delta\tau_A$ obtained with the first error detecting method becomes a positive value. Therefore, the code phase control is not possible with the second error detecting method, but is possible with the first error detecting method.

Next, as illustrated in FIG. 9, as the fifth situation, in the state where the code phase of the prompt replica signal $S_{RP}$ is retarded and when the code phase difference therebetween is small (in the case where it is not as retarded as the fourth situation), the first early correlation value $CV_E$, the first and second late correlation values $CV_L$ and $CV_{VL}$, and the prompt correlation value $CV_P$ appear in line on the correlation curve 900P within the range where the code phase difference is a negative value. However, the second early correlation value $CV_{VE}$ appears on the correlation curve 900P within the range where the code phase difference is a positive value. Then, when the code phase difference between the aimed GNSS signal and the first early correlation value $CV_E$ becomes smaller than the code phase difference between the aimed GNSS signal and the second early correlation value $CV_{VE}$, the early differential value $\Delta CV_E = CV_E - CV_{VE}$ becomes a positive value.

Therefore, both of the early differential value $\Delta CV_E$ and the late differential value $\Delta CV_E = CV_L - CV_{VE}$ become positive values. Therefore, the signs of the early differential value $\Delta CV_E$ and the late differential value $\Delta CV_L$ become the same.

In this case, the position of the code phase of the prompt replica signal $S_{RP}$ is an E point and, as illustrated in FIG. 9 at (B) and FIG. 9 at (C), both the error detection value $\Delta\tau_B$ obtained with the second error detecting method and the error detection value $\Delta\tau_A$ obtained with the first error detecting method become positive values. Therefore, the code phase control is possible either with the second error detecting method or the first error detecting method. However, since the influence of the multipath signal is easily received with the first error detecting method as described above, the method if switched to the second error detecting method. Thus, after this switch, the influence of the multipath signal is not easily received and the code phase control can be performed accurately so that that code phase of the aimed GNSS signal is locked.

As above, by using the GNSS signal processing method of this embodiment, the error detecting method can be switched at a suitable timing. Thus, the aimed GNSS signal can be surely and accurately tracked and the influence on the tracking of the aimed GNSS signal due to the multipath signal can also be suppressed.

Note that, when capturing and tracking the GNSS signal, the processing described above can be used specifically with the method described as follows. When starting the tracking of the GNSS signal, the code phases of the GNSS signal and the prompt replica signal $S_{RP}$ are not necessarily close to each other. Therefore, at a timing of starting the tracking of the GNSS signal, by using the first error detecting method, the code phase control is performed so that the code phases of the GNSS signal and the prompt replica signal $S_{RP}$ match with each other.

During this driving processing of the code tracking, the signs of the early differential value $\Delta CV_E$ and the late differential value $\Delta CV_L$ are detected. Then, when it is detected that the combination of the signs is changed, that is, when it is determined that the code phase difference between the GNSS signal and the prompt replica signal $S_{RP}$ is smaller than a predetermined value, the method is switched to the second error detecting method and the tracking of the GNSS signal is continued.

Hereinafter, for example, while the GNSS signal is tracked with the second error detecting method, by using the early differential value $\Delta CV_E$, the late differential value $\Delta CV_L$, and an early late differential value $\Delta CV_{EL}$ corresponding to the error detection value $\Delta \tau_A$ in the first error detecting method, the code phase difference between the GNSS signal and the prompt replica signal $S_{RP}$ is monitored. Further, when it is determined that the code phase difference between the GNSS signal and the prompt replica signal $S_{RP}$ becomes larger than the predetermined value based on these differential values, the method is switched to the first error detecting method and the tracking of the GNSS signal is continued.

Figure 10:
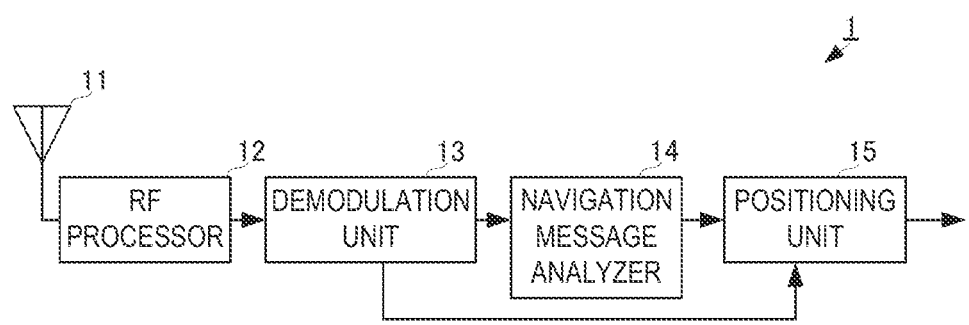
FIG. 10 is a block diagram illustrating a configuration of a positioning apparatus 1 according to the embodiment of the present invention.
Figure 11:
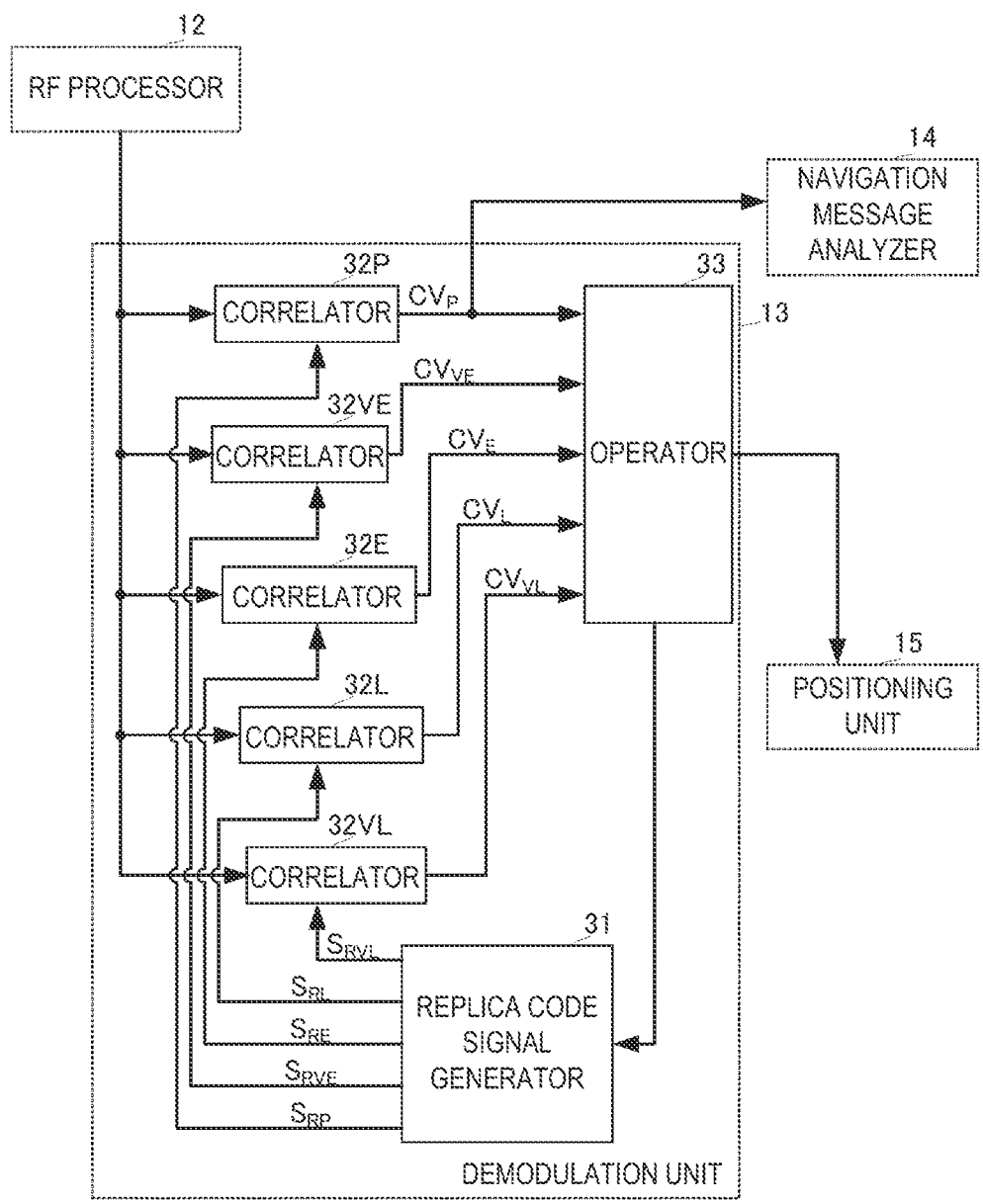
FIG. 11 is a block diagram illustrating a configuration of a demodulation unit 13 of the positioning apparatus 1 according to the embodiment of the present invention.

The GNSS signal processing method of this embodiment as described above can be achieved by the following configuration of a function part. FIG. 10 is a block diagram illustrating a configuration of a positioning apparatus 1 according to the embodiment of the present invention. FIG. 11 is a block diagram illustrating a configuration of a demodulation unit 13.

The positioning apparatus 1 includes a GNSS reception antenna 11, an RF processor 12, the demodulation unit 13 corresponding to the GNSS signal processing device of the present invention, a navigation message analyzer 14, and a positioning unit 15.

The GNSS reception antenna 11 receives the GNSS signals transmitted from GNSS satellites (e.g., GPS satellites) and outputs them to the RF processor 12. The downconverter 12 converts each GNSS signal into a predetermined intermediate-frequency signal (hereinafter, referred to as the IF signal), and outputs it to the demodulation unit 13.

Although the detailed configuration is described later by using FIG. 11, the demodulation unit 13 performs the code phase control of the replica signal with the error detection value $\Delta \tau$ such as that described above, and captures and tracks the GNSS signal formed of the IF signal. The demodulation unit 13 locks the code phase of the GNSS signal and, when succeeding in the tracking, outputs the correlation value between the GNSS signal and the prompt replica signal $S_{RP}$ (prompt correlation value $CV_P$) to the navigation analyzer 14. Moreover, the demodulation unit 13 calculates a pseudorange by integrating the error detection values $\Delta \tau$ for a predetermined period of time in the tracking state, and outputs it to the positioning unit 15.

The navigation analyzer 14 demodulates and analyzes a navigation message based on the prompt correlation value $CV_P$ transmitted from the demodulation unit 13, and gives contents of the navigation message to the positioning unit 15. The positioning unit 15 performs positioning based on the contents of the navigation message from the navigation message analyzer 14 and the pseudorange from the demodulation unit 13, and estimatedly calculates a position of the positioning apparatus 1.

As illustrated in FIG. 11, the demodulation unit 13 includes a replica signal generator 31, correlators 32P, 32VE, 32E, 32L and 32VL, and an operator 33.

The replica code generator 31 generates the prompt replica signal $S_{RP}$, the first early replica signal $S_{RE}$, the second early replica signal $S_{RVE}$, the first late replica signal $S_{RL}$, and the second late replica signal $S_{RVL}$ described above, based on the code phase control signal given from the operator 33. The replica code generator 31 outputs the prompt replica signal $S_{RP}$ to the correlator 32P. The replica code generator 31 outputs the first early replica signal $S_{RE}$ to the correlator 32E. The replica code generator 31 outputs the second early replica signal $S_{RVE}$ to the correlator 32VE. The replica code generator 31 outputs the first late replica signal $S_{RL}$ to the correlator 32L. The replica code generator 31 outputs the second late replica signal $S_{RVL}$ to the correlator 32VL.

The correlator 32P correlates the GNSS signal with the prompt replica signal $S_{RP}$ and outputs the prompt correlation value $CV_P$. The prompt correlation value $CV_P$ is outputted to the operator 33 as well as the navigation message analyzer 14. The correlator 32E correlates the GNSS signal with the first early replica signal $S_{RE}$ and outputs the first early correlation value $CV_E$. The first early correlation value $CV_E$ is outputted to the operator 33. The correlator 32VE correlates the GNSS signal with the second early replica signal $S_{RVE}$ and outputs the second early correlation value $CV_{VE}$. The second early correlation value $CV_{VE}$ is outputted to the operator 33. The correlator 32L correlates the GNSS signal with the first late replica signal $S_{RL}$ and outputs the first late correlation value $CV_L$. The first late correlation value $CV_L$ is outputted to the operator 33. The correlator 32VL correlates the GNSS signal with the second late replica signal $S_{RVL}$, and outputs the second late correlation value $CV_{VL}$. The second late correlation value $CV_{VL}$ is outputted to the operator 33.

The operator 33 is comprised of, for example, a CPU. The operator 33 stores a program which achieves the error detection value calculation and the code phase control described above, and it reads and executes the program.

The operator 33 selects the error detecting method as described above, by using the prompt correlation value $CV_P$, the first early correlation value $CV_E$, the second early correlation value $CV_{VE}$, the first late correlation value $CV_L$, and the second late correlation value $CV_{VL}$. The operator 33 calculates the error detection value $\Delta \tau$ with the selected error detecting method. The operator 33 generates a code phase control signal based on the calculated error detection value $\Delta \tau$ so that the code phase difference between the prompt replica signal and the GNSS signal becomes closer to 0. The operator 33 gives the code phase control signal to the replica signal generator 31.

By using such a configuration, as described above, the GNSS signal can surely and accurately be tracked. Further, since the accurate tracking can be performed, the code phase of the GNSS signal can be acquired highly accurately, and the demodulation of the navigation message and the calculation of the pseudorange can be performed highly accurately. Thus, highly accurate positioning can be performed.

Figure 12:
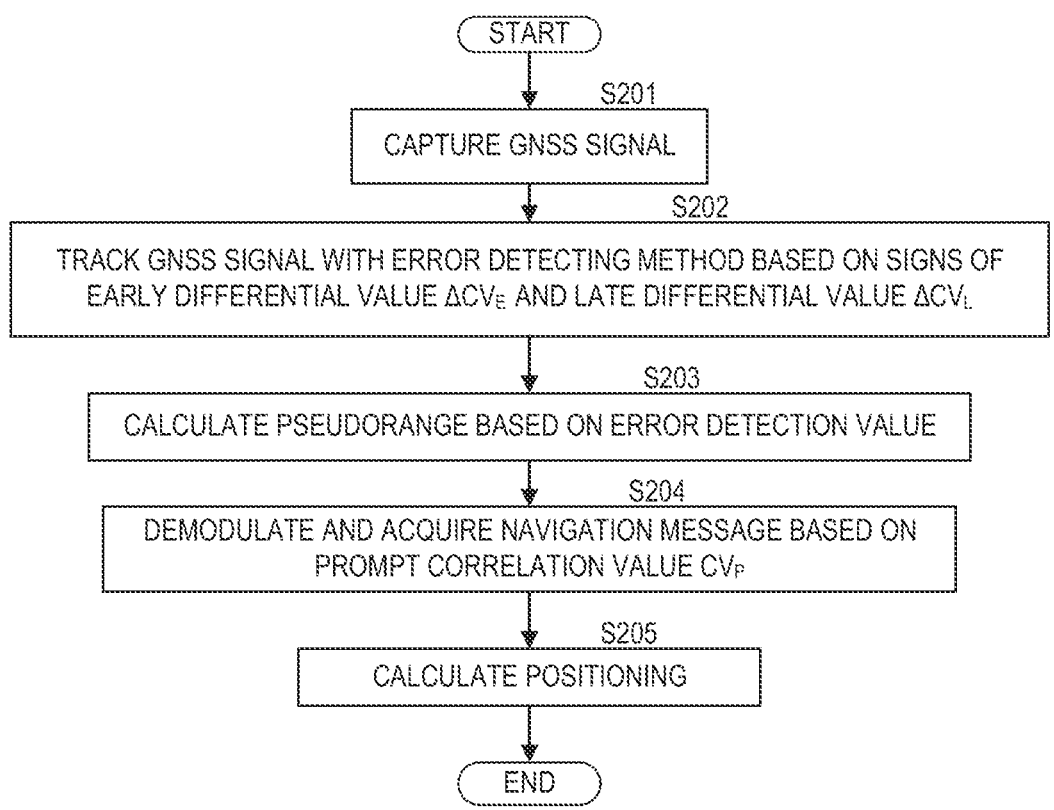
FIG. 12 is a flowchart of a positioning method according to the embodiment of the present invention.

Note that, in the above description, the example in which the positioning apparatus 1 is divided into the respective functional components to perform the positioning is shown; however, the RF processor 12, the demodulation unit 13, the navigation message analyzer 14, and the positioning unit 15 may be integrated in an information processing device, such as a computer. In this case, specifically, a flowchart of the positioning illustrated in FIG. 12 including the respective processing described above is programmed and stored. Then, the program of positioning is read and executed by the information processing device. FIG. 12 is the flowchart of a positioning method according to the embodiment of the present invention.

The GNSS signal is received and the capturing is performed (S201). As the capturing method, as described above, the plurality of replica signals are generated at the predetermined code phase intervals. Each of the plurality of the replica signals is correlated with the GNSS signal. The code phase of the replica signal with the highest correlation value is set to be the code phase of the GNSS signal.

The tracking is started by having the code phase set by the capturing as the initial phase (S202). Here, the tracking of the GNSS signal is performed while selecting the calculation method of the error detection value $\Delta\tau$, based on the signs of the early differential value $\Delta CV_E$ and the late differential value $\Delta CV_E$.

The pseudorange is calculated by integrating the error detection values $\Delta\tau$ every predetermined period of time (S203). The navigation message is demodulated and acquired by integrating the prompt correlation values $CV_P$ (S204). Note that, the performance order of the calculation of the pseudorange and the demodulation and the acquisition of the navigation message is not limited to this, and both may be performed simultaneously.

The positioning is performed by using the acquired pseudorange and the navigation message (S205).

Figure 13:
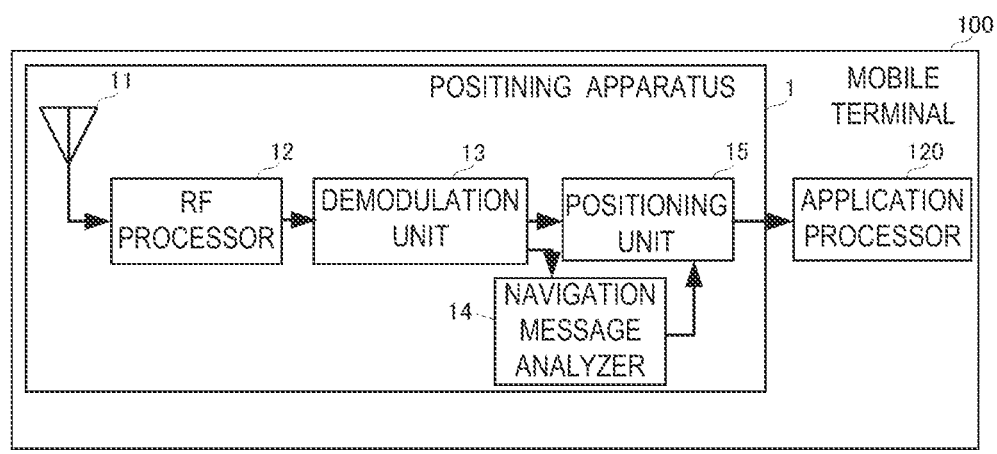
FIG. 13 is a block diagram illustrating a main configuration of a mobile terminal 100 including the positioning apparatus 1 according to the embodiment of the present invention.

The positioning apparatus 1 and the positioning function as described above are utilized in a mobile terminal 100 as illustrated in FIG. 13. FIG. 13 is a block diagram illustrating a main configuration of the mobile terminal 100 including the positioning apparatus 1 according to the embodiment of the present invention.

The mobile terminal 100 as illustrated in FIG. 13 is, for example, a mobile phone, a car navigation device, a PND, a camera, or a clock, and includes a GNSS reception antenna 11, an RF processor 12, a demodulation unit 13, a navigation message analyzer 14, a positioning unit 15, and an application processor 120. The GNSS reception antenna 11, the RF processor 12, the demodulation unit 13, the navigation message analyzer 14, and the positioning unit 15 are configured as described above, and the positioning apparatus 1 is configured by these components as described above.

The application processor 120 displays a position and a speed thereof based on the positioning result outputted from the positioning apparatus 1, and performs the processing to be utilized in navigation and the like.

With such a configuration, since the highly accurate positioning result described above can be obtained, highly accurate positional display, navigation and the like can be achieved.

Note that, in the above description, as the first error detecting method, the error detection value $\Delta\tau_A$ is calculated based on the first early correlation value $CV_E$ and the first late correlation value $CV_L$. As the first error detecting method, an error detection value $\Delta\tau_{AA}$ may be calculated based on the second early correlation value $CV_{VE}$ and the second late correlation value $CV_{VL}$.

In this case, the following equation may be used.

$$\Delta\tau_{AA} = \frac{CV_{VE} - CV_{VL}}{2CV_P} \quad (3)$$

Moreover, the spacing for the calculation of the early differential value $\Delta CV_E$ and the late differential value $\Delta CV_E$ and the spacing for the calculation of the error detection value may be different from each other.

DESCRIPTION OF REFERENCE CHARACTERS

1: Positioning Apparatus
11: GNSS Reception Antenna 11
12: RF Processor
13: Demodulation Unit
14: Navigation Message Analyzer
15: Positioning Unit
31: Replica Signal Generator
32P, 32VE, 32E, 32L, 32VL: Correlator
33: Operator
100: Mobile Terminal
120: Application Processor

The invention claimed is:
1. A GNSS signal processing method, comprising:
a correlating process for correlating a GNSS signal with each of a first early replica signal that is advanced from a prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase;
a differential value calculating process for calculating an early differential value by subtracting a second early correlation value that is obtained based on the correlation result between the GNSS signal and the second early replica signal from a first early correlation value that is obtained based on the correlation result between the GNSS signal and the first early replica signal, and calculating a late differential value by subtracting a second late correlation value that is obtained based on the correlation result between the GNSS signal and the second late replica signal from a first late correlation value that is obtained based on the correlation result between the GNSS signal and the first late replica signal;
an error detection value calculating process for setting an error calculating method based on signs of the early differential value and the late differential value, and calculating an error detection value by using the set error calculating method; and a code phase controlling process for controlling a code phase of the prompt replica signal based on the error detection value, and tracking a code phase of the GNSS signal, wherein when the signs of the early differential value and the late differential value are different from each other, the error detection value is calculated with a first error detecting method using a first calculation equation in which a code phase range where the error detection value takes a value other than 0 is a wide code phase range, and wherein when the signs of the early differential value and the late differential value are the same as each other, the error detection value is calculated with a second error detecting method using a second calculation equation in which the code phase range where the error detection value takes a value other than 0 is a narrow code phase range that is narrower than the wide code phase range.

2. The GNSS signal processing method of claim 1, wherein the first calculation equation uses the first early correlation value and the first late correlation value, or the second early correlation value and the second late correlation value, and wherein the second calculation equation uses the first and second early correlation values and the first and second late correlation values.

3. A positioning method, comprising:
a process for acquiring a navigation message based on the correlation result between the GNSS signal tracked with the GNSS signal processing method of claim 1 and the prompt replica signal;
a process for calculating a pseudorange based on the error detection value of the tracked GNSS signal; and
a process for performing positioning by using the navigation message and the pseudorange.

4. An apparatus comprising:
a processor; and
a memory storing instructions that, when executed by the processor, cause the apparatus to:
correlate a received GNSS signal with each of a first early replica signal that is advanced from a prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase;
calculate an early differential value by subtracting a second early correlation value that is obtained based on the correlation result between the GNSS signal and the second early replica signal from a first early correlation value that is obtained based on the correlation result between the GNSS signal and the first early replica signal;
calculate a late differential value by subtracting a second late correlation value that is obtained based on the correlation result between the GNSS signal and the second late replica signal from a first late correlation value that is obtained based on the correlation result between the GNSS signal and the first late replica signal;
set an error calculating method based on signs of the early differential value and the late differential value, and calculate a error detection value by using the set error calculating method;

control a code phase of the prompt replica signal based on the error detection value, and track a code phase of the GNSS signal;

when the signs of the early differential value and the late differential value are different from each other, calculate the error detection value with a first error detecting method using a first calculation equation in which a code phase range where the error detection value takes a value other than 0 is a wide code phase range; and when the signs of the early differential value and the late differential value are the same as each other, calculate the error detection value with a second error detecting method using a second calculation equation in which the code phase range where the error detection value takes a value other than 0 is a narrow code phase range that is narrower than the wide code phase range.

5. An apparatus comprising:
a processor; and
a memory storing instructions that, when executed by the processor, cause the apparatus to:
acquire a navigation message based on the correlation result between the tracked GNSS signal and the prompt replica signal derived by executing the instructions of claim 4;
calculate a pseudorange based on the error detection value of the tracked GNSS signal; and
perform positioning by using the navigation message and the pseudorange.

6. A GNSS signal processing device, comprising:
a correlation unit configured to correlate a GNSS signal with each of a first early replica signal that is advanced from a prompt replica signal by a first code phase, a first late replica signal that is retarded from the prompt replica signal by the first code phase, a second early replica signal that is advanced from the prompt replica signal by a second code phase, and a second late replica signal that is retarded from the prompt replica signal by the second code phase; and an operator configured to calculate an early differential value by subtracting a second early correlation value that is obtained based on the correlation result between the GNSS signal and the second early replica signal from a first early correlation value that is obtained based on the correlation result between the GNSS signal and the first early replica signal, calculate a late differential value by subtracting a second late correlation value that is obtained based on the correlation result between the GNSS signal and the second late replica signal from a first late correlation value that is obtained based on the correlation result between the GNSS signal and the first late replica signal, set an error calculating method based on signs of the early differential value and the late differential value, calculate an error detection value by using the set error calculating method, and control a code phase of the prompt replica signal based on the error detection value, wherein when the signs of the early differential value and the late differential value are different from each other, the operator calculates the error detection value with a first error detecting method using a first calculation equation in which a code phase range where the error detection value takes a value other than 0 is a wide code phase range, and wherein when the signs of the early differential value and the late differential value are the same as each other, the operator calculates the error detection value with a second error detecting method using a second calculation equation in which the code phase range where the error detection value takes a value other than 0 becomes a narrow code phase range that is narrower than the wide code phase range.

7. A positioning apparatus including the GNSS signal processing device of claim 6 and configured to perform positioning based on a tracking result, comprising:
- a navigation message analyzer configured to acquire a navigation message based on the correlation result between the tracked GNSS signal and the prompt replica signal; and
- a positioning unit configured to perform positioning by using a pseudorange calculated based on the error detection value of the tracked GNSS signal, and the navigation message.

8. A mobile terminal, comprising:
the positioning apparatus of claim 7; and
an application processor configured to execute a predetermined application by using the positioning result of the positioning unit.

* * * * *